(12) United States Patent
Ito et al.

(10) Patent No.: US 11,465,483 B2
(45) Date of Patent: Oct. 11, 2022

(54) VARIABLE STIFFNESS VIBRATION DAMPING DEVICE

(71) Applicant: HONDA MOTOR CO., LTD., Tokyo (JP)

(72) Inventors: Yuho Ito, Wako (JP); Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 408 days.

(21) Appl. No.: 16/800,830

(22) Filed: Feb. 25, 2020

(65) Prior Publication Data

US 2020/0269672 A1 Aug. 27, 2020

(30) Foreign Application Priority Data

Feb. 27, 2019 (JP) .............................. JP2019-034951

(51) Int. Cl.
*B60K 5/12* (2006.01)
*F16F 13/30* (2006.01)
*F16F 13/10* (2006.01)

(52) U.S. Cl.
CPC .......... *B60K 5/1283* (2013.01); *B60K 5/1208* (2013.01); *F16F 13/10* (2013.01);
(Continued)

(58) Field of Classification Search
CPC ... B60K 5/1283; B60K 5/1208; F16F 13/305; F16F 2224/045; F16F 2228/066; F16F 9/53; F16F 9/3481; F16F 9/3485
See application file for complete search history.

(56) References Cited

U.S. PATENT DOCUMENTS 3,947,007 A * 3/1976 Pelat ...................... F16F 13/08
267/140.13
4,432,441 A * 2/1984 Kurokawa ............... G02B 7/00
188/267
(Continued)

FOREIGN PATENT DOCUMENTS

CN 201922881 U 8/2011
CN 103119323 A 5/2013
(Continued)

OTHER PUBLICATIONS

First Notification of Office Action for Patent Application CN 202010118619.8, dated Jun. 17, 2021; 15 pp.

*Primary Examiner* — Robert A. Siconolfi
*Assistant Examiner* — James K Hsiao
(74) *Attorney, Agent, or Firm* — Armstrong Teasdale LLP

(57) ABSTRACT

A variable stiffness vibration damping device includes a first support member, a second support member, a main elastic member, a diaphragm, a partition elastic member, a first communication passage, a coil, a yoke, and a magnetic fluid. The first communication passage is provided in one of the first support member and the second support member such that a first liquid chamber and a second liquid chamber communicate with each other via the first communication passage. The first communication passage includes a first circumferential passage. The coil is wound coaxially with the one of the first support member and the second support member. The yoke is included in the one of the first support member and the second support member and forms a first magnetic gap overlapping at least partially with the first circumferential passage.

6 Claims, 13 Drawing Sheets

US 11,465,483 B2
Page 2

(52) U.S. Cl.
CPC ...... *F16F 13/305* (2013.01); *F16F 2224/045* (2013.01); *F16F 2228/066* (2013.01)

(56) References Cited

U.S. PATENT DOCUMENTS

| | | | | |
|---|---|---|---|---|
| 4,610,420 A * | 9/1986 | Fukushima | ............ | F16F 13/262 180/300 |
| 4,650,170 A * | 3/1987 | Fukushima | ............ | F16F 13/10 267/140.14 |
| 4,693,455 A * | 9/1987 | Andra | ............ | F16F 13/264 188/379 |
| 4,773,634 A * | 9/1988 | Hamaekers | ............ | F16F 13/106 137/493 |
| 4,793,599 A * | 12/1988 | Ishioka | ............ | F16F 13/264 188/320 |
| 4,936,556 A * | 6/1990 | Makibayashi | ............ | F16F 13/16 267/140.13 |
| 5,060,919 A * | 10/1991 | Takano | ............ | F16F 13/30 180/312 |
| 5,165,668 A * | 11/1992 | Gennesseaux | ............ | F16F 13/28 267/140.15 |
| 5,492,312 A * | 2/1996 | Carlson | ............ | B66B 7/044 188/267.2 |
| 5,718,418 A * | 2/1998 | Gugsch | ............ | F16F 7/1011 335/277 |
| 5,820,113 A * | 10/1998 | Laughlin | ............ | F16F 13/26 188/267 |
| 5,957,440 A * | 9/1999 | Jones | ............ | F16F 13/26 244/54 |
| 5,961,104 A * | 10/1999 | Gennesseaux | ............ | F16F 13/264 267/140.14 |
| 6,056,279 A * | 5/2000 | Lee | ............ | F16F 13/10 180/300 |
| 6,120,012 A * | 9/2000 | Shibata | ............ | F16F 13/26 267/140.14 |
| 6,325,364 B1 * | 12/2001 | Muramatsu | ............ | F16F 15/03 267/140.14 |
| 6,386,529 B2 * | 5/2002 | Bik | ............ | F16F 13/16 267/293 |
| 6,406,010 B1 * | 6/2002 | Yano | ............ | F16F 13/106 267/140.13 |
| 6,412,761 B1 * | 7/2002 | Baudendistel | ............ | F16F 13/105 267/140.14 |
| 6,422,546 B1 * | 7/2002 | Nemoto | ............ | F16F 13/26 267/140.13 |
| 6,622,995 B2 * | 9/2003 | Baudendistel | ............ | F16F 13/305 267/140.14 |
| 6,896,109 B2 * | 5/2005 | Kelso | ............ | F16F 9/535 188/267.2 |
| 6,921,067 B2 * | 7/2005 | Gries | ............ | F16F 13/26 267/140.14 |
| 7,070,027 B2 * | 7/2006 | Manecke | ............ | F16F 9/535 188/312 |
| 7,118,100 B2 * | 10/2006 | Tewani | ............ | F16F 13/305 188/267.2 |
| 7,510,061 B2 * | 3/2009 | Bodie | ............ | F16F 13/105 188/267.2 |
| 7,905,470 B2 * | 3/2011 | Kojima | ............ | F16F 13/305 267/140.14 |
| 7,946,561 B2 * | 5/2011 | Nemoto | ............ | F16F 13/26 123/355 |
| 8,672,105 B2 * | 3/2014 | Kim | ............ | F16F 13/305 188/267.2 |
| 8,919,748 B2 * | 12/2014 | Urayama | ............ | F16F 7/1011 267/140.14 |
| 9,038,997 B2 * | 5/2015 | Bradshaw | ............ | F16F 13/16 296/190.07 |
| 9,051,989 B2 * | 6/2015 | Schumann | ............ | F16F 13/305 |
| 9,097,310 B2 * | 8/2015 | Gaspar | ............ | F16F 13/16 |
| 9,212,716 B2 * | 12/2015 | Yoon | ............ | F16F 15/08 |
| 9,273,751 B2 * | 3/2016 | Setty | ............ | F16F 13/305 |
| 9,322,451 B2 * | 4/2016 | Schumann | ............ | F16F 13/105 |
| 10,150,510 B2 * | 12/2018 | Baluch | ............ | F16F 13/28 |
| 11,215,261 B2 * | 1/2022 | Ito | ............ | F16F 9/3481 |
| 2002/0036372 A1 * | 3/2002 | Goto | ............ | F16F 13/268 267/136 |
| 2002/0153647 A1 * | 10/2002 | Baudendistel | ............ | F16F 13/26 267/140.14 |
| 2002/0171186 A1 * | 11/2002 | Baudendistel | ............ | F16F 13/305 267/140.13 |
| 2004/0233025 A1 * | 11/2004 | Kon | ............ | H01F 7/1607 335/220 |
| 2005/0173211 A1 * | 8/2005 | Hopkins | ............ | F16F 13/305 188/267 |
| 2005/0230890 A1 * | 10/2005 | Tewani | ............ | F16F 13/305 267/140.13 |
| 2005/0236750 A1 * | 10/2005 | Freudenberg | ............ | F16F 13/262 267/140.11 |
| 2005/0242321 A1 * | 11/2005 | Iyengar | ............ | F16F 13/305 188/267.2 |
| 2006/0254871 A1 * | 11/2006 | Murty | ............ | F16D 37/02 192/21.5 |
| 2007/0057421 A1 * | 3/2007 | Nanno | ............ | F16F 13/105 267/140.13 |
| 2007/0144843 A1 * | 6/2007 | Bodie | ............ | F16F 13/305 188/267 |
| 2009/0079118 A1 * | 3/2009 | Muraoka | ............ | F16F 13/26 267/140.14 |
| 2012/0242021 A1 * | 9/2012 | Koyama | ............ | F16F 13/103 267/140.13 |
| 2012/0313306 A1 * | 12/2012 | Ueki | ............ | F16F 13/262 267/140.11 |
| 2013/0001842 A1 * | 1/2013 | Kanaya | ............ | F16F 13/106 267/140.13 |
| 2013/0187318 A1 | 7/2013 | Shimamura | | |
| 2014/0217661 A1 * | 8/2014 | Schumann | ............ | F16F 13/305 267/140.14 |
| 2014/0354381 A1 * | 12/2014 | Kohlhafer | ............ | H01H 50/20 335/179 |
| 2016/0003322 A1 * | 1/2016 | Bradshaw | ............ | B60K 5/1208 267/140.13 |
| 2017/0058989 A1 * | 3/2017 | Koyama | ............ | H02K 5/225 |
| 2017/0204935 A1 * | 7/2017 | Yasuda | ............ | F16F 13/26 |
| 2017/0313171 A1 * | 11/2017 | Yoon | ............ | B60K 5/1208 |
| 2017/0317552 A1 * | 11/2017 | Kanaya | ............ | H02K 5/15 |
| 2018/0135722 A1 * | 5/2018 | Oniwa | ............ | F16F 13/107 |
| 2019/0077243 A1 * | 3/2019 | Grajeda | ............ | F16F 13/264 |
| 2020/0109761 A1 * | 4/2020 | Inoue | ............ | H01F 1/447 |

FOREIGN PATENT DOCUMENTS

| | | | |
|---|---|---|---|
| CN | 106917843 A | | 7/2017 |
| FR | 2634530 A1 | | 1/1990 |
| JP | 2002327787 A | | 11/2002 |
| JP | 2003335164 A | | 11/2003 |
| JP | 2004263783 A | | 9/2004 |
| JP | 2005098312 A | | 4/2005 |
| JP | 2005239084 A | | 9/2005 |
| JP | 2017078491 A | * | 4/2017 |

* cited by examiner

VARIABLE STIFFNESS VIBRATION DAMPING DEVICE

TECHNICAL FIELD

The present invention relates to a variable stiffness vibration damping device filled with a magnetic fluid.

BACKGROUND ART

A known liquid filled vibration damping device, which is used for a liquid filled engine mount and the like, includes a first mounting member mounted to a vibration source side, a second mounting member mounted to a vibration receiving side, an insulator (anti-vibration rubber) made of an elastic material such as rubber and interposed between the first mounting member and the second mounting member, a liquid chamber having a wall partially defined by the insulator, a partition member partitioning an inside of the liquid chamber into a primary liquid chamber and a secondary liquid chamber, a diaphragm closing the secondary liquid chamber, and a resonance orifice connecting the primary liquid chamber and the secondary liquid chamber (for example, JP2005-98312A and JP2004-263783A).

When low-amplitude vibrations are generated, the engine mount is required to absorb an internal pressure of the primary liquid chamber and to function as a low dynamic spring. When high-amplitude vibrations having a higher amplitude than the low-amplitude vibrations are generated, the engine mount is required to have high damping characteristics. In the liquid filled vibration damping device disclosed in JP2005-98312A, in order to further improve the function as the low dynamic spring and the high damping characteristics, the partition member is provided with a non-stretchable cloth partition membrane that is loosened in an initial state. On the other hand, in the liquid filled engine mount disclosed in JP2004-263783A, the partition member is composed of a partition plate and a movable membrane. The movable membrane is made of a rubber elastic body, and is bonded to the partition plate by vulcanization so that the movable membrane is integrated with the partition plate.

These liquid filled vibration damping devices damp low-frequency vibrations (for example, vibrations of 0 Hz to 15 Hz) with a high amplitude by utilizing an orifice resonance. On the other hand, these liquid filled vibration damping devices absorb high-frequency vibrations with a low amplitude by deforming the cloth partition membrane or the movable membrane. In these liquid filled vibration damping devices, an amount of a liquid passing through the orifice is adjusted by varying stiffness of the diaphragm, so that a resonance frequency is adjusted.

Also, a so-called active control mount (ACM) is known as an active engine mount (for example, JP2005-239084A). The ACM is provided with an actuator for forcibly vibrating a mass element, so that the ACM can theoretically generate any desired damping force regardless of disturbance working thereon. Therefore, the ACM can realize a high damping effect both in a steady state and in an unsteady state.

However, in the liquid filled vibration damping device disclosed in JP2005-98312A and JP2004-263783A, it is necessary to determine stiffness and damping characteristics of the entire vibration damping device by using parameters such as stiffness and damping characteristics of the anti-vibration rubber, volume of the primary liquid chamber, volume of the secondary liquid chamber, a diameter of the orifice, length of the orifice, stiffness of the membrane, and stiffness of the diaphragm. Accordingly, an adjustment range of the stiffness and the damping characteristics of the entire vibration damping device is narrow, and therefore it is difficult to have desired characteristics at arbitrary frequencies. For example, it is difficult to make adjustments at several frequencies such that the damping characteristics are enhanced when vibrations around 10 Hz that have an influence on riding comfort of an automobile is generated, while the damping characteristics are declined when vibrations around 130 Hz that have an influence on a muffled sound of an engine is generated.

On the other hand, in the ACM, a mechanism for directly inputting external energy thereto becomes complicated. Also, in the ACM, it is necessary to design a control system for avoiding instability and the cost of components thereof is increased.

SUMMARY OF THE INVENTION

In view of such a problem of the prior art, a primary object of the present invention is to provide a variable stiffness vibration damping device that can vary stiffness and damping characteristics as desired with a simple configuration.

To achieve such an object, one embodiment of the present invention provides a variable stiffness vibration damping device (10) including: an annular first support member (11) defining an inner hole (13) therein; a second support member (12) including a support portion (15) separated from the first support member (11) with respect to an axial direction; an annular main elastic member (17) connecting the first support member (11) and the support portion (15) of the second support member (12); a diaphragm (19) closing the inner hole (13) of the first support member (11) such that a liquid chamber (18) is defined between the main elastic member (17) and the diaphragm (19); a partition elastic member (20) partitioning the liquid chamber (18) into a first liquid chamber (18A) on a side of the main elastic member (17) and a second liquid chamber (18B) on a side of the diaphragm (19); a first communication passage (44) provided in one of the first support member (11) and the second support member (12) such that the first liquid chamber (18A) and the second liquid chamber (18B) communicate with each other via the first communication passage (44), the first communication passage (44) including a first circumferential passage (41) extending in a circumferential direction; at least one coil (26) wound coaxially with and provided in the one of the first support member (11) and the second support member (12); a yoke (38) included in the one of the first support member (11) and the second support member (12) and configured to form a first magnetic gap (40A) overlapping at least partially with the first circumferential passage (41); and a magnetic fluid (50) filling the first liquid chamber (18A), the second liquid chamber (18B), and the first communication passage (44).

According to this arrangement, a magnetic field is generated around the coil by supplying an electric current thereto, and flow resistance of the magnetic fluid in the first circumferential passage is varied by lines of magnetic force passing through the first circumferential passage. Therefore, stiffness (specifically, stiffness related to displacement of the first support member and the second support member in the axial direction) and damping characteristics in the axial direction of the variable stiffness vibration damping device can be varied as desired by an electric current flowing through the coil. In addition, stiffness and damping characteristics in the axial direction of the variable stiffness vibration damping device can be varied with a simple configuration by providing the one of the first support member and the second support member with the first circumferential passage, the coil, and the yoke.

Preferably, the second support member (12) further includes an axial portion (16) protruding from the support portion (15) toward the first support member (11) and received by the inner hole (13) of the first support member (11), the partition elastic member (20) has an annular shape around the axial portion (16) to connect an inner circumferential portion of the first support member (11) and an outer circumferential portion of the axial portion (16), the partition elastic member (20) is provided with at least one pair of third fluid chambers (21) opposed to each other in a radial direction with the axial portion (16) therebetween and partitioned with each other in the circumferential direction, a second communication passage (49) is provided in the one of the first support member (11) and the second support member (12) such that the at least one pair of third fluid chambers (21) communicate with each other via the second communication passage (49), and the second communication passage (49) includes a second circumferential passage (46) extending in the circumferential direction, and the yoke (38) is configured to form a second magnetic gap (40B) overlapping at least partially with the second circumferential passage (46).

According to this arrangement, a magnetic field is generated around the coil by supplying an electric current thereto, and flow resistance of the magnetic fluid in the second circumferential passage is varied by lines of magnetic force passing through the second circumferential passage. Therefore, stiffness (specifically, stiffness related to displacement of the first support member and the second support member in the radial direction) and damping characteristics in the radial direction of the variable stiffness vibration damping device can be varied as desired by an electric current flowing through the coil. In addition, stiffness and damping characteristics in the radial direction of the variable stiffness vibration damping device can be varied with a simple configuration by providing the one of the first support member and the second support member with the second circumferential passage, the coil, and the yoke.

Preferably, the first circumferential passage (41) is located on an outer circumferential side of the at least one coil (26), and the second circumferential passage (46) is located on an inner circumferential side of the at least one coil (26).

According to this arrangement, it is possible to concentrate magnetic fields in each of the first circumferential passage and the second circumferential passage. In addition, the first circumferential passage can be lengthened in the circumferential direction, so that stiffness and damping characteristics in the axial direction of the variable stiffness vibration damping device can be varied more greatly.

Preferably, the at least one coil (26) includes: a first coil (26A) adjacent to the first circumferential passage (41); and a second coil (26B) adjacent to the second circumferential passage (46).

According to this arrangement, a magnetic field working on the first circumferential passage can be generated by supplying an electric current to the first coil, and a magnetic field working on the second circumferential passage can be generated by supplying an electric current to the second coil. Therefore, it is possible to individually vary flow resistance of the magnetic fluid in the first circumferential passage and flow resistance of the magnetic fluid in the second circumferential passage.

Preferably, the yoke (38) includes: a first yoke (38A) configured to form the first magnetic gap (40A) and surrounding the first coil (26A); and a second yoke (38B) configured to form the second magnetic gap (40B) and surrounding the second coil (26B).

According to this arrangement, a magnetic field generated in the first yoke works on the first magnetic gap by supplying an electric current to the first coil, and a magnetic field generated in the second yoke works on the second magnetic gap by supplying an electric current to the second coil. Therefore, it is possible to individually vary flow resistance of the magnetic fluid in the first circumferential passage and flow resistance of the magnetic fluid in the second circumferential passage.

Preferably, the first yoke (38A) and the second yoke (38B) include a portion common to each other, and the first coil (26A) and the second coil (26B) are configured to generate magnetic fields in directions opposite to each other.

According to this arrangement, it is possible to downsize the variable stiffness vibration damping device by providing the first yoke and the second yoke with the portion common to each other. Further, a magnetic field generated in the first yoke by supplying an electric current to the first coil and a magnetic field generated in the second yoke by supplying an electric current to the second coil are not weakened due to interference thereof.

Preferably, the partition elastic member (20) is located at least partially in the inner hole (13) of the first support member (11) and extends in a direction substantially orthogonal to the axial direction.

Preferably, the yoke (38) includes: a passage forming member (35) forming the first circumferential passage (41); and a pair of stacked members (36, 37) stacked in the axial direction with the passage forming member (35) therebetween, and magnetic permeability of the passage forming member (35) is lower than that of the pair of stacked members (36, 37).

Thus, according to an embodiment of the present invention, it is possible to provide a variable stiffness vibration damping device that can vary stiffness and damping characteristics as desired with a simple configuration.

DESCRIPTION OF THE PREFERRED EMBODIMENT(S)

In the following, embodiments of the present invention will be described in detail with reference to the drawings.

First Embodiment

Figure 1:
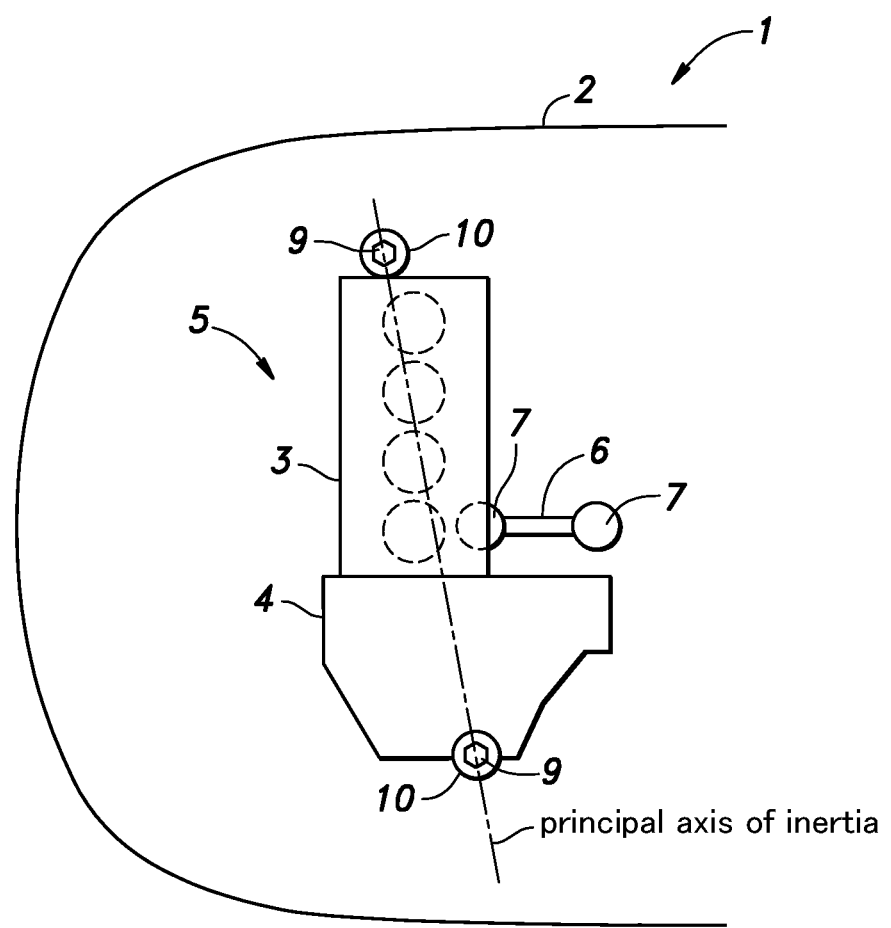
FIG. 1 is a plan view showing variable stiffness vibration damping devices mounted to a vehicle body according to a first embodiment of the present invention.
Figure 2:
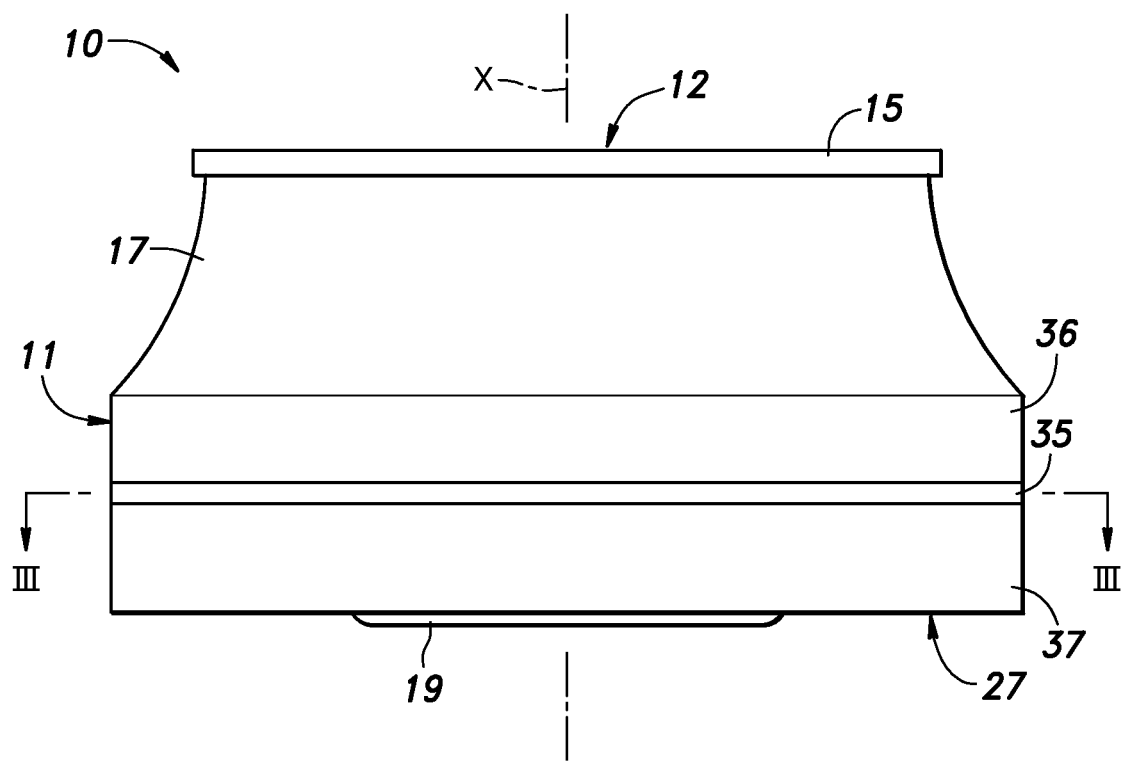
FIG. 2 is a side view of the variable stiffness vibration damping device shown in FIG. 1.

First, a first embodiment of the present invention will be described with reference to FIG. 1 to FIG. 10B. As shown in FIG. 1, an engine 3 is transversely arranged in a front portion of a vehicle body 2 of an automobile 1 (vehicle). A transmission 4 is provided integrally with the engine 3, and a power plant 5 is composed of the engine 3, the transmission 4, and the like. The power plant 5 is supported by the vehicle body 2 via a pair of engine mounts (a side mount and a trans mount) and a torque rod 6. The pair of engine mounts consist of a pair of variable stiffness vibration damping devices 10 (hereinafter simply referred to as "vibration damping devices 10").

The vibration damping devices 10 receive a main load (own weight) of the power plant 5. Each vibration damping device 10 is located on a principal axis of inertia of the whole power plant 5 and is fixed to the vehicle body 2. On the other hand, the torque rod 6 is connected to the engine 3 via a rubber bushing 7 on one longitudinal end thereof, and is connected to the vehicle body 2 via a rubber bushing 7 on another longitudinal end thereof. The torque rod 6 prevents a swing (roll) of the power plant 5 about a roll axis (principal axis of inertia) due to driving torque of the engine 3.

In each vibration damping device 10, a bolt hole 8 (see FIG. 4) is formed along an axis X thereof. A support member (not shown) of the power plant 5 is fastened to each vibration damping device 10 by a bolt 9 (see FIG. 1) screwed into (engaged with) the bolt hole 8. Thereby, the power plant 5 is supported by the vehicle body 2 via each vibration damping device 10.

In the following, one of the vibration damping devices 10 will be described in detail. Hereinafter, an axial direction of the vibration damping device 10 (namely, an extending direction of the bolt hole 8) is defined as a vertical direction based on a mounting posture of the vibration damping device 10 shown in FIG. 1. However, such a definition about the direction does not limit arrangement of the vibration damping device 10.

As shown in FIGS. 2 to 5, the vibration damping device 10 includes a first support member 11 mounted to the vehicle body 2 and a second support member 12 to which the power plant 5 is mounted. The first support member 11 has an annular shape and defines a circular inner hole 13 extending in a direction of the axis X (hereinafter referred to as "axial direction"). The second support member 12 defines the above-mentioned bolt hole 8.

Figure 4:
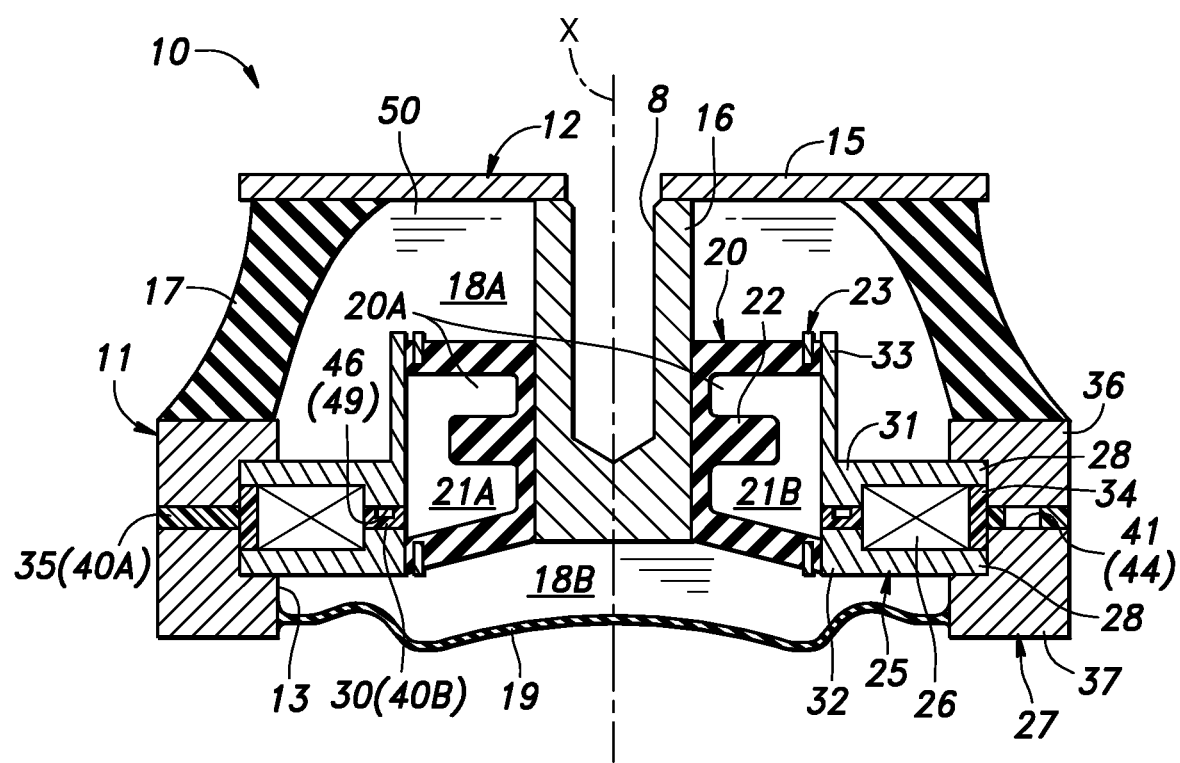
FIG. 4 is a sectional view taken along a line IV-IV of FIG. 3.
Figure 5:
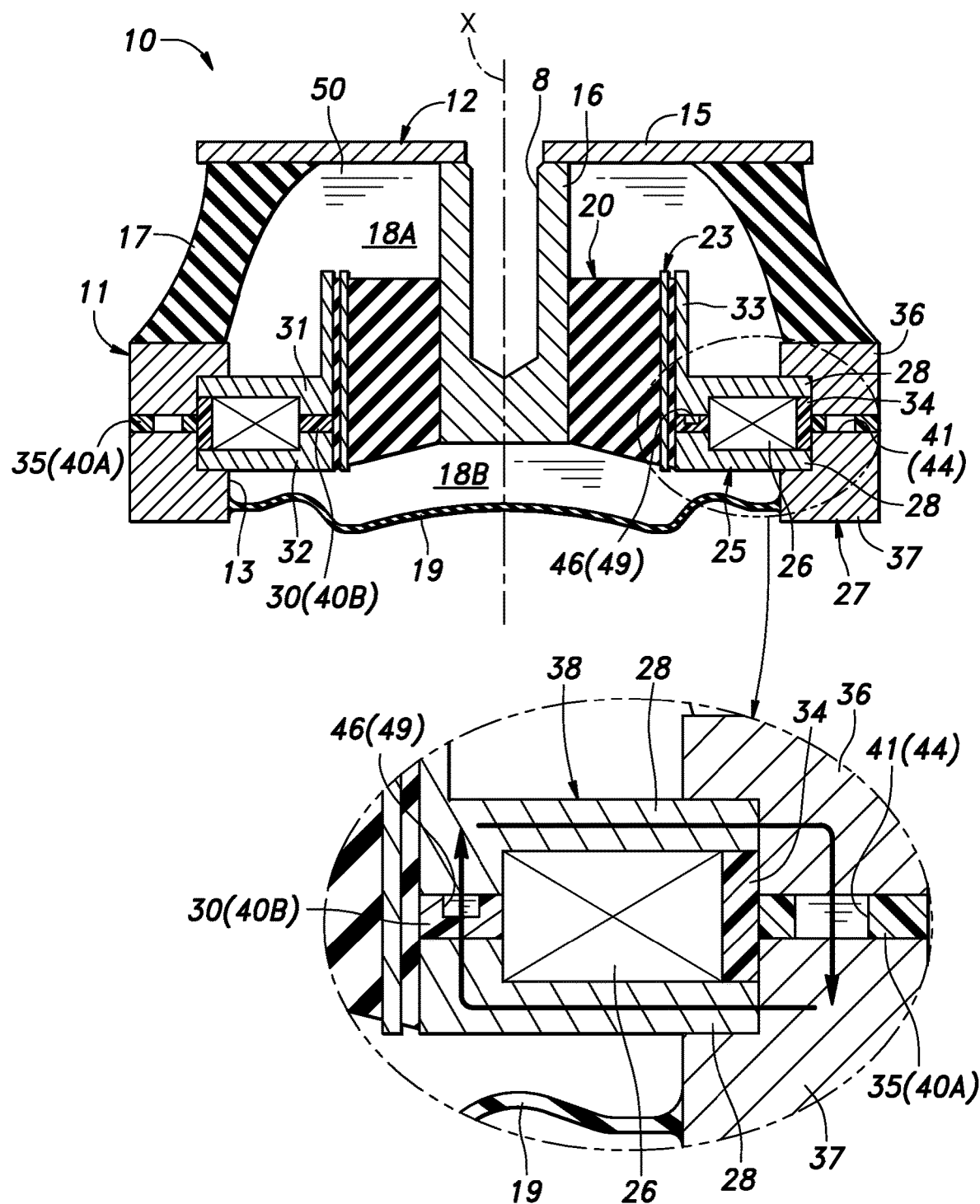
FIG. 5 is a sectional view taken along a line V-V of FIG. 3.

As shown in FIGS. 4 and 5, the second support member 12 includes: a support portion 15 separated from the first support member 11 in the axial direction; and an axial portion 16 coupled to a lower face of the support portion 15 and protrudes downward from the support portion 15 toward the first support member 11. The support portion 15 has a disk-like shape with a through hole formed in the center thereof. An outer diameter of the support portion 15 is smaller than that of the first support member 11. The axial portion 16 has a cylindrical shape and defines the bolt hole 8 on the axis X. The bolt hole 8 has a bottomed shape and opens upward. An outer diameter of the axial portion 16 is smaller than an inner diameter of the first support member 11. The axial portion 16 is received by the inner hole 13 of the first support member 11. The second support member 12 is a rigid member made of metal. For example, the second support member 12 may include a metal having high magnetic permeability such as iron or cobalt, or may include a metal having low magnetic permeability such as aluminum.

A circumference of an upper portion of the first support member 11 and an outer circumferential portion of the support portion 15 of the second support member 12 are connected to each other via an annular main elastic member 17. The main elastic member 17 is a spring member that absorbs vibrations of the power plant 5, and has a truncated cone shape with an outer diameter of an upper end smaller than that of a lower end. A diaphragm 19 is mounted to a lower portion of the first support member 11. The diaphragm 19 closes the inner hole 13 of the first support member 11 such that a liquid chamber 18 (18A, 18B) is defined between the main elastic member 17 and the diaphragm 19. The main elastic member 17 and the diaphragm 19 are made of an elastic material such as elastomer or rubber. When the main elastic member 17 receives a load or vibrations of the power plant 5 and is elastically deformed, the diaphragm 19 is elastically deformed in response to the elastic deformation of the main elastic member 17 to keep a volume of the liquid chamber 18 constant.

As shown in FIG. 5, a partition elastic member 20 is partially located in the inner hole 13 of the first support member 11. The partition elastic member 20 extends in a direction substantially orthogonal to the axial direction, and partitions the liquid chamber 18 into a first liquid chamber 18A and a second liquid chamber 18B. The first liquid chamber 18A is formed between the partition elastic member 20 and the main elastic member 17, while the second liquid chamber 18B is formed between the partition elastic member 20 and the diaphragm 19. That is, the first liquid chamber 18A is on a side of the main elastic member 17 and partially defined by the main elastic member 17, while the second liquid chamber 18B is on a side of the diaphragm 19 and partially defined by the diaphragm 19. The partition elastic member 20 is made of an elastic material such as elastomer or rubber and has a substantially cylindrical shape. An outer circumferential portion of the partition elastic member 20 is coupled to an inner circumferential face of the first support member 11, and an inner circumferential portion of the partition elastic member 20 is coupled to an outer circumferential face of the axial portion 16 of the second support member 12.

Figure 3:
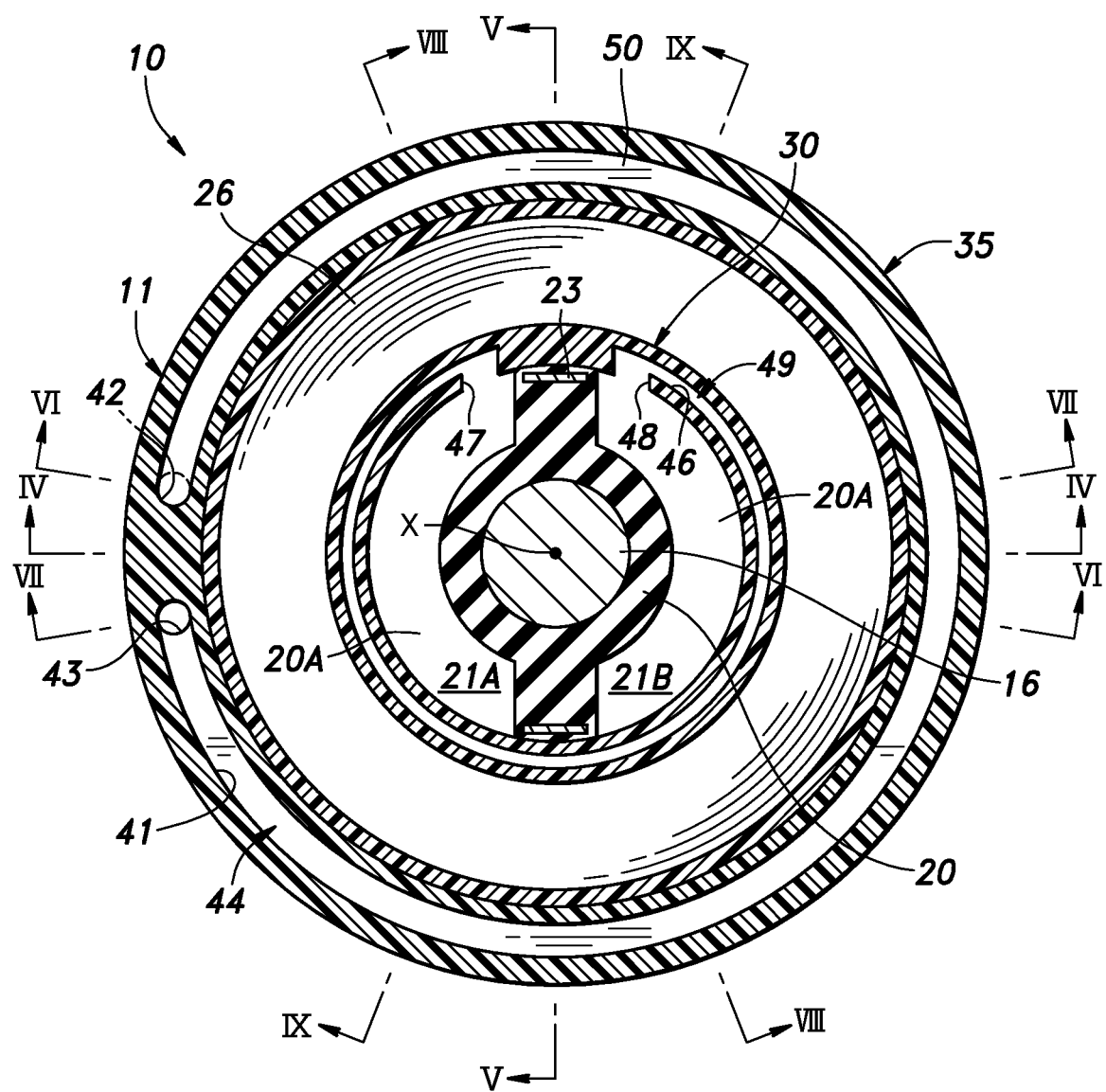
FIG. 3 is a sectional view taken along a line III-III of FIG. 2.

As shown in FIGS. 3 and 4, a pair of recesses 20A are formed at different circumferential positions on an outer circumferential portion of the partition elastic member 20, and a pair of third liquid chambers 21 (21A, 21B) consist of the pair of recesses 20A. The pair of third liquid chambers 21 are opposed to each other in the radial direction with the axial portion 16 therebetween and separated from each other in the circumferential direction. The pair of third liquid chambers 21 are opposed to each other with the axis X therebetween, and phases of the pair of third liquid chambers 21 are different from each other by 180°. In the present embodiment, the pair of third liquid chambers 21 are opposed to each other in the fore and aft direction. A fan-shaped portion 22 (stopper) protruding radially toward the outer radial direction is formed integrally with the partition elastic member 20 at an intermediate portion in the axial direction of each recess 20A.

As shown in FIGS. 3 to 5, a substantially cylindrical reinforcement member 23 is coaxially embedded in an outer circumferential portion of the partition elastic member 20. Specifically, the partition elastic member 20 is formed integrally with the reinforcement member 23, the first support member 11, and the second support member 12, by pouring unvulcanized rubber into a mold in which the reinforcement member 23, the first support member 11, and the second support member 12 are arranged at prescribed positions and then vulcanizing the rubber. The reinforcement member 23 is not exposed on an outer circumferential face of the partition elastic member 20. The reinforcement member 23 is a rigid member made of a non-magnetic metal with low magnetic permeability (for example, aluminum), and maintains a shape of the outer circumferential face of the partition elastic member 20 on which the pair of recesses 20A are formed.

In the present embodiment, most of the reinforcement member 23 except upper and lower ends thereof is embedded in the partition elastic member 20. In another embodiment, the entirety of the reinforcement member 23 may be embedded in the partition elastic member 20.

After the partition elastic member 20 is formed, the main elastic member 17 is formed integrally with both the first support member 11 and the second support member 12 by pouring unvulcanized rubber into a mold in which the first support member 11 and the second support member 12 are integrally arranged at prescribed positions and then vulcanizing the rubber. Also, after the partition elastic member 20 is formed, the diaphragm 19 is formed integrally with the first support member 11 by pouring unvulcanized rubber into a mold in which the first support member 11 and the second support member 12 are integrally arranged at prescribed positions and then vulcanizing the rubber.

As shown in FIGS. 4 and 5, the first support member 11 includes an annular inner yoke 25 a coil 26, and an annular outer yoke 27. The inner yoke 25 is provided in an inner circumferential portion of the first support member 11. The coil 26 is coaxially wound around an outer circumference of the inner yoke 25. The outer yoke 27 is provided in an outer circumferential portion of the first support member 11. The outer yoke 27 is integrated with the inner yoke 25 and surrounds the coil 26 in cooperation with the inner yoke 25.

A pair of outer flange portions 28 that accommodate the coil 26 are formed integrally with upper and lower ends of the inner yoke 25. The pair of outer flange portions 28 compose an upper yoke and a lower yoke. The inner yoke 25 includes an inner passage forming member 30, an upper inner yoke 31, and a lower inner yoke 32. The inner passage forming member 30 is arranged at an intermediate portion in the axial direction of the inner yoke 25. The upper inner yoke 31 and the lower inner yoke 32 are stacked in the axial direction with the inner passage forming member 30 therebetween. A cylindrical extending portion 33 is formed integrally with the upper inner yoke 31. The extending portion 33 extends upward along the axis X from an inner circumferential portion of the upper inner yoke 31. Thereby, the partition elastic member 20 is lengthened in the vertical direction, so that volumes of the pair of third liquid chambers 21 are increased.

The coil 26 is a cylindrical member made of a coated copper wire wound in a coil-like shape, and is sealed in a resin member. Both ends of the coated copper wire, which function as lead wires, are drawn out of the vibration damping device 10. A cylindrical spacer 34 is provided on an outer circumferential side of the coil 26. Upper and lower ends of the spacer 34 abut against outer circumferential portions of the pair of outer flange portions 28. A drawing hole (not shown) is formed in the outer yoke 27, and both ends of the coated copper wire are drawn out of the vibration damping device 10 through the drawing hole.

The outer yoke 27 includes an outer passage forming member 35, an upper outer yoke 36, and a lower outer yoke 37. The outer passage forming member 35 is arranged at an intermediate portion in the axial direction of the outer yoke 27. The upper outer yoke 36 and the lower outer yoke 37 (a pair of stacked members) are stacked in the axial direction with the outer passage forming member 35 therebetween. The upper outer yoke 36 and the lower outer yoke 37 are joined to the outer passage forming member 35 in a state where an outer circumferential portion of the inner yoke 25 is interposed between the upper outer yoke 36 and the lower outer yoke 37. Thereby, the outer yoke 27 is coupled to the inner yoke 25. The inner yoke 25 and the outer yoke 27 compose a yoke 38 (see an enlarged view of FIG. 5) surrounding the coil 26.

The upper inner yoke 31, the lower inner yoke 32, the upper outer yoke 36, and the lower outer yoke 37 are made of a metal having high magnetic permeability, and specifically, include a ferromagnetic metal such as iron and cobalt. In the present embodiment, the upper inner yoke 31, the lower inner yoke 32, the upper outer yoke 36, and the lower outer yoke 37 are made of iron. The spacer 34, the inner passage forming member 30, and the outer passage forming member 35 are rigid members made of a non-magnetic metal or resin having a lower magnetic permeability than the metal constituting the upper inner yoke 31, the lower inner yoke 32, the upper outer yoke 36, and the lower outer yoke 37. For example, the spacer 34, the inner passage forming member 30, and the outer passage forming member 35 are made of aluminum (in the drawings, resinous hatching is applied to these members so that these members are easily understood).

The inner passage forming member 30 and the outer passage forming member 35 are made of a non-magnetic material, and thereby annular magnetic gaps 40 (40A, 40B) are formed in the yoke 38, which is formed around the coil 26 by the inner yoke 25 and the outer yoke 27. The outer passage forming member 35 forms a first magnetic gap 40A in an outer circumference of the coil 26, and the inner passage forming member 30 forms a second magnetic gap 40B in an inner circumference of the coil 26.

As shown in FIG. 3, the outer passage forming member 35 forms a first circumferential passage 41 extending in the circumferential direction for an angle larger than 180° and smaller than 360°. In the present embodiment, the first circumferential passage 41 extends in the circumferential direction for about 350° (an angle smaller than 360°). The first circumferential passage 41 consists of a slot penetrating through the outer passage forming member 35.

Figure 6:
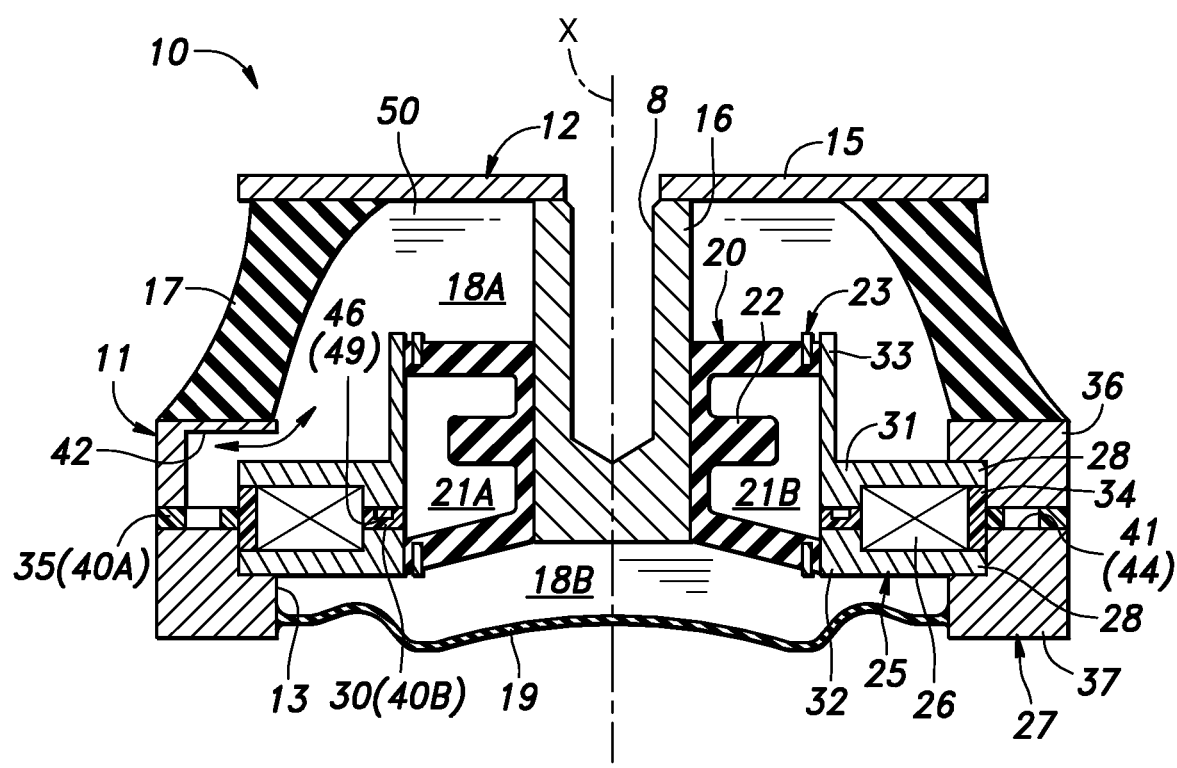
FIG. 6 is a sectional view taken along a line VI-VI of FIG. 3.
Figure 7:
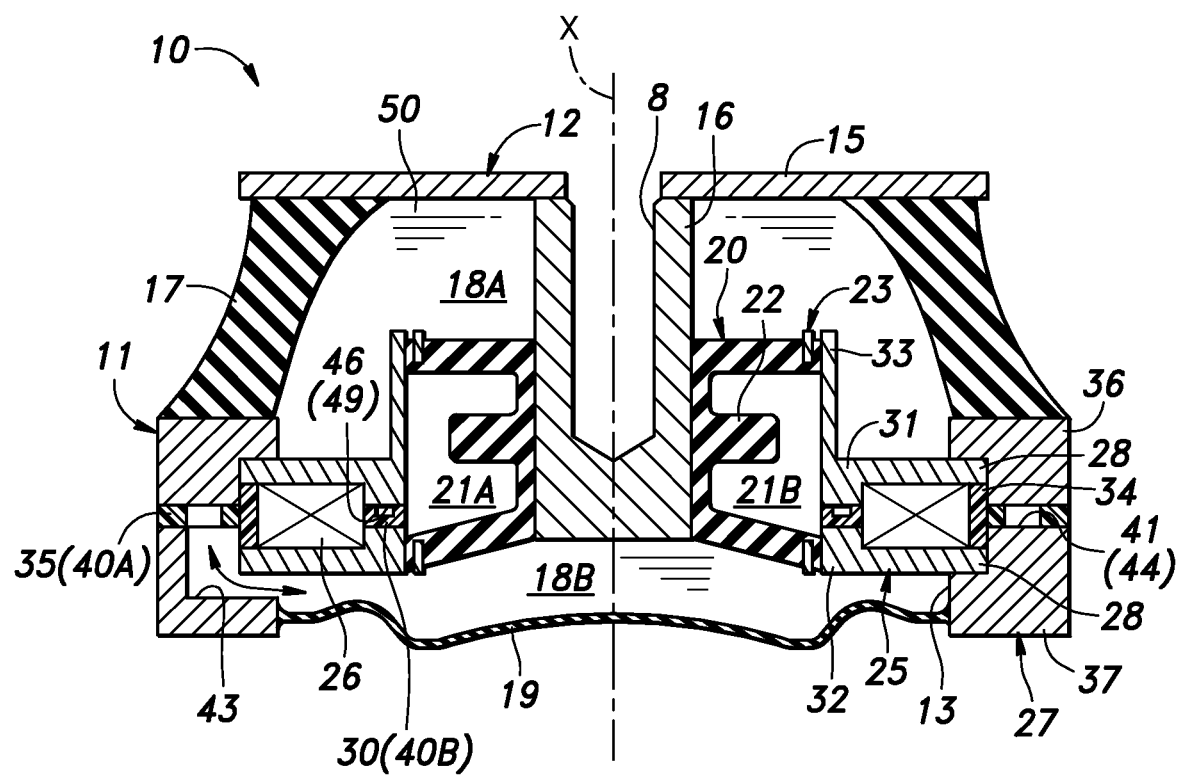
FIG. 7 is a sectional view taken along a line VII-VII of FIG. 3.

As shown in FIGS. 3, 6 and 7, a first communication port 42 is provided at one end of the first circumferential passage 41. The first communication port 42 is formed in the upper outer yoke 36 such that the first circumferential passage 41 and the first liquid chamber 18A communicate with each other via the first communication port 42. A second communication port 43 is provided at another end of the first circumferential passage 41. The second communication port 43 is formed in the lower outer yoke 37 such that the first circumferential passage 41 and the second liquid chamber 18B communicate with each other via the second communication port 43. The first circumferential passage 41, the first communication port 42, and the second communication port 43 compose a first communication passage 44 via which the first liquid chamber 18A and the second liquid chamber 18B communicate with each other. The first communication passage 44 is formed in the outer yoke 27 of the first support member 11. The first magnetic gap 40A formed in the outer yoke 27 by the outer passage forming member 35 includes a portion (gap) overlapping with the first circumferential passage 41.

As shown in FIG. 3, the inner passage forming member 30 forms a second circumferential passage 46 extending in the circumferential direction for an angle larger than 180° and smaller than 360°. In the present embodiment, the second circumferential passage 46 extends in the circumferential direction for about 330° (an angle smaller than 360°. The second circumferential passage 46 consists of a bottomed groove formed on an upper face of the inner passage forming member 30.

Figure 8:
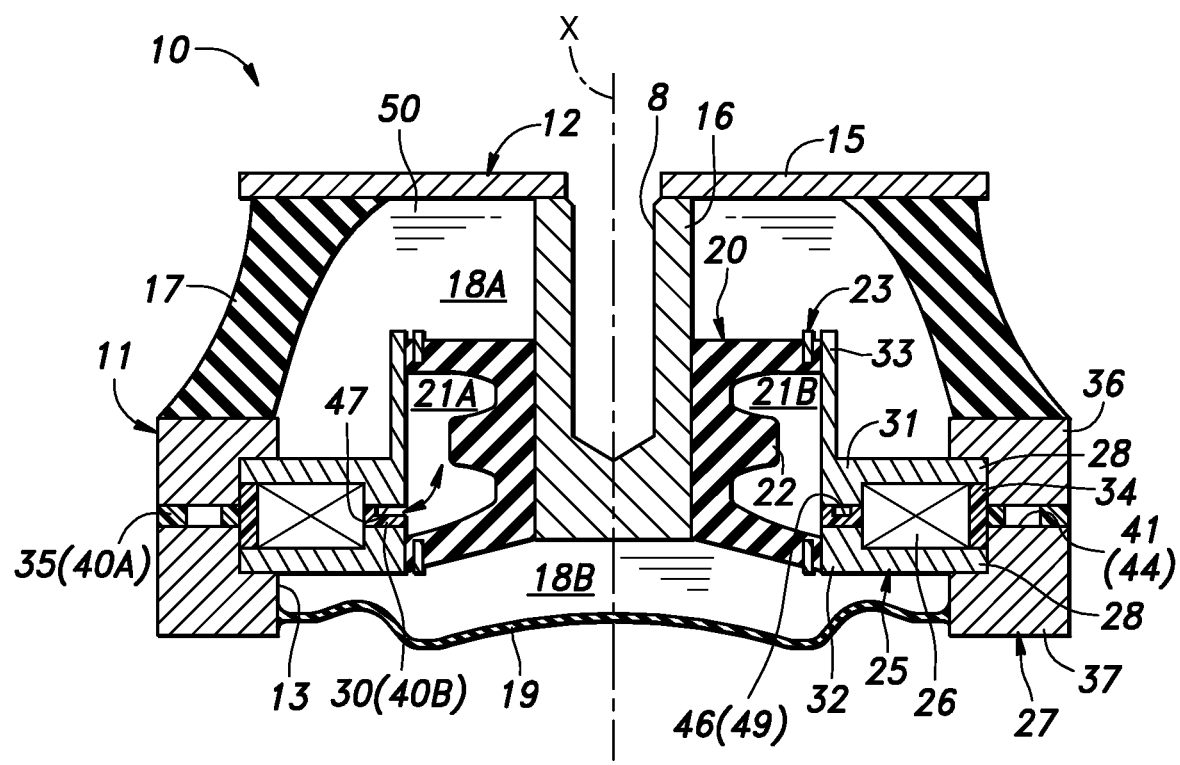
FIG. 8 is a sectional view taken along a line VIII-VIII of FIG. 3.
Figure 9:
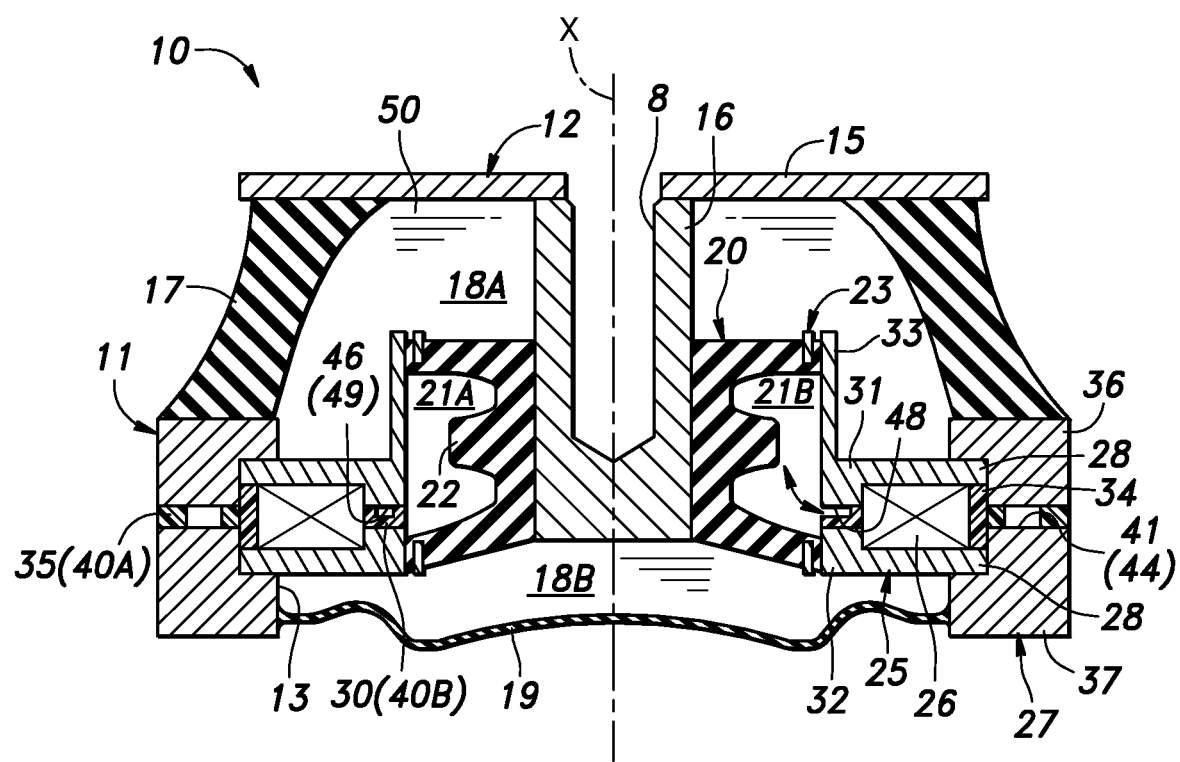
FIG. 9 is a sectional view taken along a line IX-IX of FIG. 3.

As shown in FIGS. 3, 8 and 9, a third communication port 47 is provided at one end of the second circumferential passage 46. The third communication port 47 is formed in the inner passage forming member 30 such that the second circumferential passage 46 and the third liquid chamber 21A (one of the third liquid chambers 21) communicate with each other via the third communication port 47. A fourth communication port 48 is provided at another end of the second circumferential passage 46. The fourth communication port 48 is formed in the inner passage forming member 30 such that the second circumferential passage 46 and the third liquid chamber 21B (another of the third liquid chambers 21) communicate with each other via the fourth communication port 48. The second circumferential passage 46, the third communication port 47, and the fourth communication port 48 compose a second communication passage 49 via which the pair of third liquid chambers 21 communicate with each other. The second communication passage 49 is formed in the inner yoke 25 of the first support member 11. The second magnetic gap 40B formed in the inner yoke 25 by the inner passage forming member 30 includes a portion (gap) overlapping with the second circumferential passage 46.

The first liquid chamber 18A, the second liquid chamber 18B, the pair of third liquid chambers 21, the first communication passage 44, and the second communication passage 49 are filled with a magnetic fluid 50. The magnetic fluid 50 is an incompressible fluid containing iron particles dispersed in a solvent such as an oil, and preferably consists of a magneto-rheological fluid (MRF) or a magneto-rheological compound (MRC) that can change viscoelasticity (particularly, viscosity) depending on an applied magnetic field. In the present embodiment, the MRC is used as the magnetic fluid 50. When a magnetic field is applied to the magnetic fluid 50, the iron particles therein are aligned along the direction of the magnetic field to form chain-like clusters. Thereby, the chain-like clusters hinder a flow of the solvent in the direction orthogonal to the magnetic field, whereby the viscosity of the magnetic fluid 50 increases and the magnetic fluid 50 is semi-solidified.

Next, operation of the vibration damping device 10 according to the present embodiment will be described. As shown in FIG. 5, when the second support member 12 is displaced vertically with respect to the first support member 11, the main elastic member 17 expands and contracts vertically. Thus, the volume of the first liquid chamber 18A and that of the second liquid chamber 18B change in an opposite relationship. That is, as the volume of one of the first liquid chamber 18A and the second liquid chamber 18B decreases, the volume of another of the first liquid chamber 18A and the second liquid chamber 18B increases. In response to these changes in the volumes, as shown in FIGS. 6 and 7, the magnetic fluid 50 filling the one of the first liquid chamber 18A and the second liquid chamber 18B moves to another of the first liquid chamber 18A and the second liquid chamber 18B via the first communication passage 44. At this time, resistance is applied to the magnetic fluid 50 flowing in the first communication passage 44, and thereby the vibrations applied to the vibration damping device 10 are damped.

When a voltage is applied to both ends of the coated copper wire composing the coil 26, a magnetic field is generated around the coil 26 by an electric current flowing therethrough. Arrows in the enlarged view of FIG. 5 indicate lines of magnetic force corresponding to the magnetic field generated by the coil 26. A magnetic circuit is formed by the inner yoke 25 and the outer yoke 27 of the first support member 11, and the magnetic field concentrates in the first circumferential passage 41 of the first communication passage 44.

By applying the magnetic field to the first circumferential passage 41, viscosity of the magnetic fluid 50 in the first communication passage 44 increases. Accordingly, the resistance applied to the magnetic fluid 50 flowing in the first communication passage 44 increases, so that a damping force against vertical vibrations applied to the vibration damping device 10 increases. Also, by increasing the resistance applied to the magnetic fluid 50 flowing in the first communication passage 44, the second support member 12 becomes less likely to move vertically with respect to the first support member 11, so that vertical stiffness of the vibration damping device 10 is increased. As described above, by controlling the voltage applied to the coil 26, the damping force of the vibration damping device 10 against the vertical vibrations can be controlled.

As shown in FIG. 4, when the second support member 12 is displaced in the fore and aft direction with respect to the first support member 11, the main elastic member 17 is deformed so as to bend in the fore and aft direction. Thereby, the partition elastic member 20 is deformed such that one of the front and rear portions of the partition elastic member 20 contracts in the fore and aft direction and another of the front and rear portions of the partition elastic member 20 expands in the fore and aft direction. At this time, the volumes of the first liquid chamber 18A and the second liquid chamber 18B do not change, and the volumes of the pair of third liquid chambers 21 change in an opposite relationship. That is, as the volume of one of the third liquid chambers 21 decreases, the volume of another of the third liquid chambers 21 increases. In response to these changes in the volumes, as shown in FIGS. 8 and 9, the magnetic fluid 50 filling the one of the third liquid chambers 21 moves to another of the third liquid chambers 21 via the second communication passage 49. At this time, resistance is applied to the magnetic fluid 50 flowing in the second communication passage 49, and thereby the vibrations applied to the vibration damping device 10 are damped.

As shown in the enlarged view of FIG. 5, when a voltage is applied to both ends of the coated copper wire composing the coil 26, a magnetic field is generated around the coil 26 by an electric current flowing therethrough. A magnetic circuit is formed by the inner yoke 25 and the outer yoke 27 of the first support member 11, and the magnetic field concentrates in the second circumferential passage 46 of the second communication passage 49.

By applying the magnetic field to the second circumferential passage 46, viscosity of the magnetic fluid 50 in the second communication passage 49 increases. Accordingly, the resistance applied to the magnetic fluid 50 flowing in the second communication passage 49 increases, so that a damping force against fore and aft vibrations applied to the vibration damping device 10 increases. Also, by increasing the resistance applied to the magnetic fluid 50 flowing in the second communication passage 49, the second support member 12 becomes less likely to move in the fore and aft direction with respect to the first support member 11, so that fore and aft stiffness of the vibration damping device 10 is increased. As described above, by controlling the voltage applied to the coil 26, the damping force of the vibration damping device 10 against the fore and aft vibrations can be controlled.

Next, the effect of the vibration damping device 10 will be described. The vibration damping device 10 can vary viscosity of the magnetic fluid 50 by supplying an electric current to the coil 26, so that stiffness of the vibration damping device 10 can be varied. To vary stiffness of the vibration damping device 10 effectively, it is desirable that a magnetic field generated in the coil 26 concentrate in a flowing passage of the magnetic fluid 50.

In the present embodiment, as shown in FIG. 5, the coil 26 is wound coaxially with and provided in the first support member 11, and the yoke 38 is provided in the first support member 11 such that the yoke 38 forms the first magnetic gap 40A overlapping at least partially (namely, partially or entirely) with the first circumferential passage 41. Accordingly, a magnetic field generated around the coil 26 by supplying an electric current thereto concentrates in the first circumferential passage 41, and flow resistance of the magnetic fluid 50 in the first circumferential passage 41 is varied. Therefore, stiffness (specifically, stiffness related to displacement of the first support member 11 and the second support member 12 in the axial direction) and damping characteristics in the axial direction of the vibration damping device 10 can be varied as desired by an electric current flowing through the coil 26. In addition, stiffness and damping characteristics in the axial direction of the vibration damping device 10 can be varied with a simple configuration by providing the first support member 11 with the first circumferential passage 41, the coil 26, and the yoke 38.

As shown in FIGS. 3 and 4, the second support member 12 includes the axial portion 16 protruding from the support portion 15 and received by the inner hole 13 of the first support member 11, and an inner circumferential portion of the first support member 11 and an outer circumferential portion of the axial portion 16 are connected by the partition elastic member 20. The pair of third liquid chambers 21 opposed to each other in the radial direction with the axial portion 16 therebetween is formed in the partition elastic member 20. The second communication passage 49 that includes the second circumferential passage 46 is provided in the first support member 11, and the yoke 38 forms the second magnetic gap 40B overlapping at least partially (namely, partially or entirely) with the second circumferential passage 46. Accordingly, stiffness (specifically, stiffness related to displacement of the first support member 11 and the second support member 12 in the radial direction) and damping characteristics in the radial direction of the vibration damping device 10 can be varied as desired by an electric current flowing through the coil 26. In addition, stiffness and damping characteristics in the radial direction of the vibration damping device 10 can be varied with a simple configuration by providing the first support member 11 with the second circumferential passage 46, the coil 26, and the yoke 38.

As shown in FIG. 3, in the present embodiment, the first circumferential passage 41 is located on an outer circumferential side of the coil 26, and the second circumferential passage 46 is located on an inner circumferential side of the coil 26. Accordingly, it is possible to concentrate magnetic fields in each of the first circumferential passage 41 and the second circumferential passage 46. In addition, the first circumferential passage 41 can be lengthened in the circumferential direction, so that stiffness and damping characteristics in the axial direction of the vibration damping device 10 can be varied more greatly.

Figure 10A:
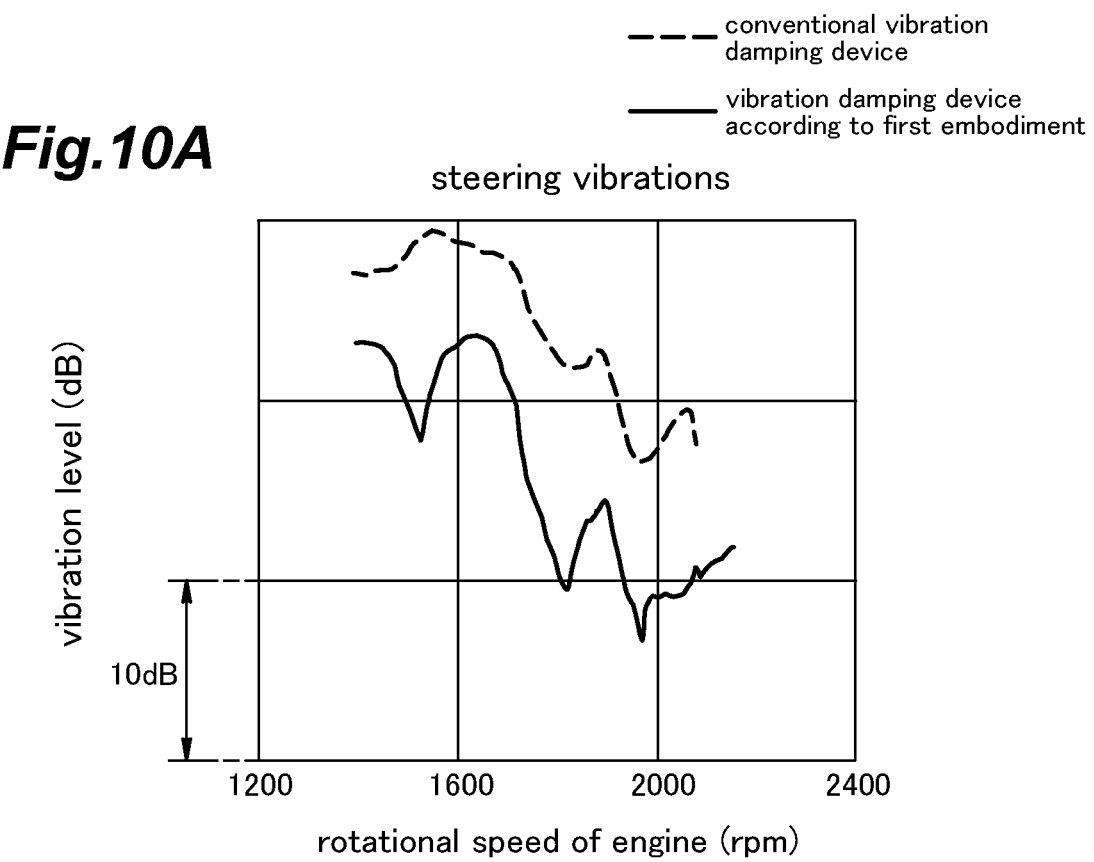
FIG. 10A is a graph showing a vibration level of steering vibrations.
Figure 10B:
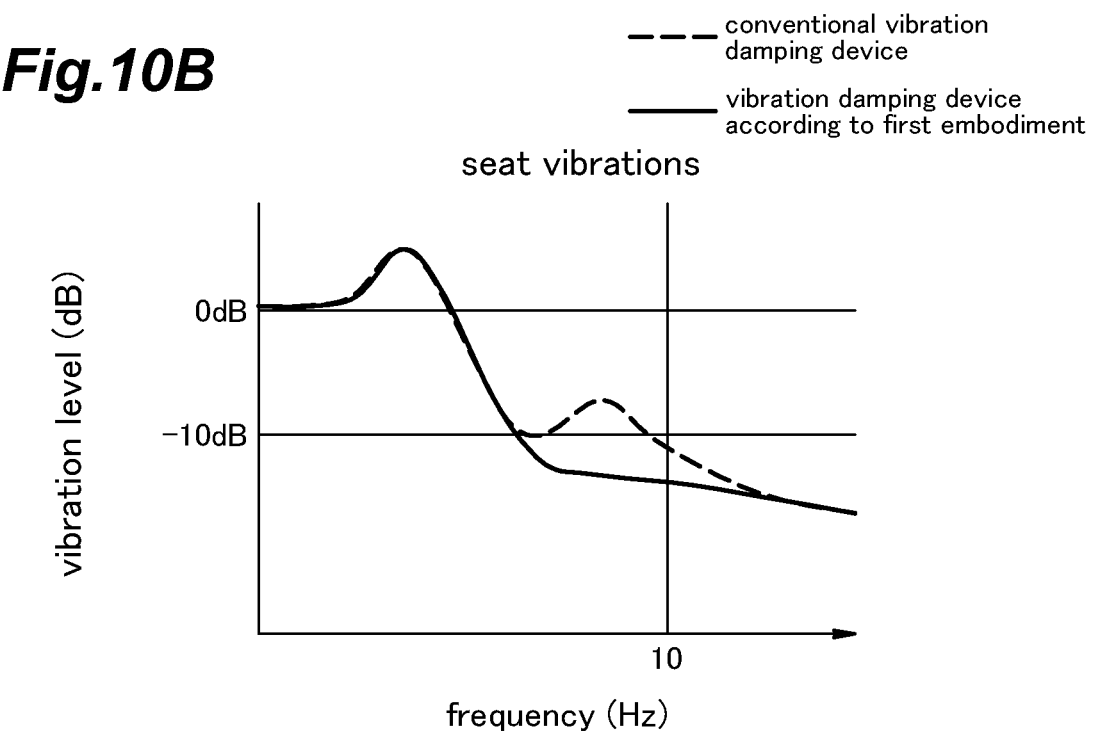
FIG. 10B is a graph showing a vibration level of seat vibrations.

FIGS. 10A and 10B are graphs each showing a vibration level depending on a control state of the vibration damping device 10 according to the first embodiment, which is used as the engine mount. FIG. 10A shows a vibration level of steering vibrations (vibrations generated in a steering wheel) during acceleration of the automobile 1. FIG. 10B shows a vibration level (displacement gain of a road surface) of seat vibrations (vibrations generated in a seat) during acceleration of the automobile 1. In FIGS. 10A and 10B, the vertical axis of the graph represents a vibration level. In FIG. 10A, the horizontal axis of the graph represents a rotational speed of an engine. In FIG. 10B, the horizontal axis of the graph represents a frequency.

As shown in FIG. 10A, with regard to the vibrations generated in the steering wheel during acceleration of the automobile 1, the vibration level is reduced over an entire normal use range of the rotational speed of the engine in a case where the vibration damping device 10 according to the first embodiment is used in a low stiffness state, compared with a case where a conventional vibration damping device with high stiffness is used. Also, as shown in FIG. 10B, with regard to the vibrations generated in the seat during acceleration of the automobile 1, the vibration level is reduced in a frequency range around 10 Hz in a case where the vibration damping device 10 according to the first embodiment is used in a low stiffness state, compared with a case where a conventional vibration damping device with high stiffness is used.

Second Embodiment

Next, a second embodiment of the present invention will be described with reference to FIG. 11. Elements of the second embodiment that are the same as or similar to those of the first embodiment are given the same reference numerals as the first embodiment, and descriptions of the second embodiment that may duplicate those of the first embodiment are omitted. In the second embodiment, configurations around the coil 26 are different from those in the first embodiment. In the following, the second embodiment will be specifically described.

Figure 11:
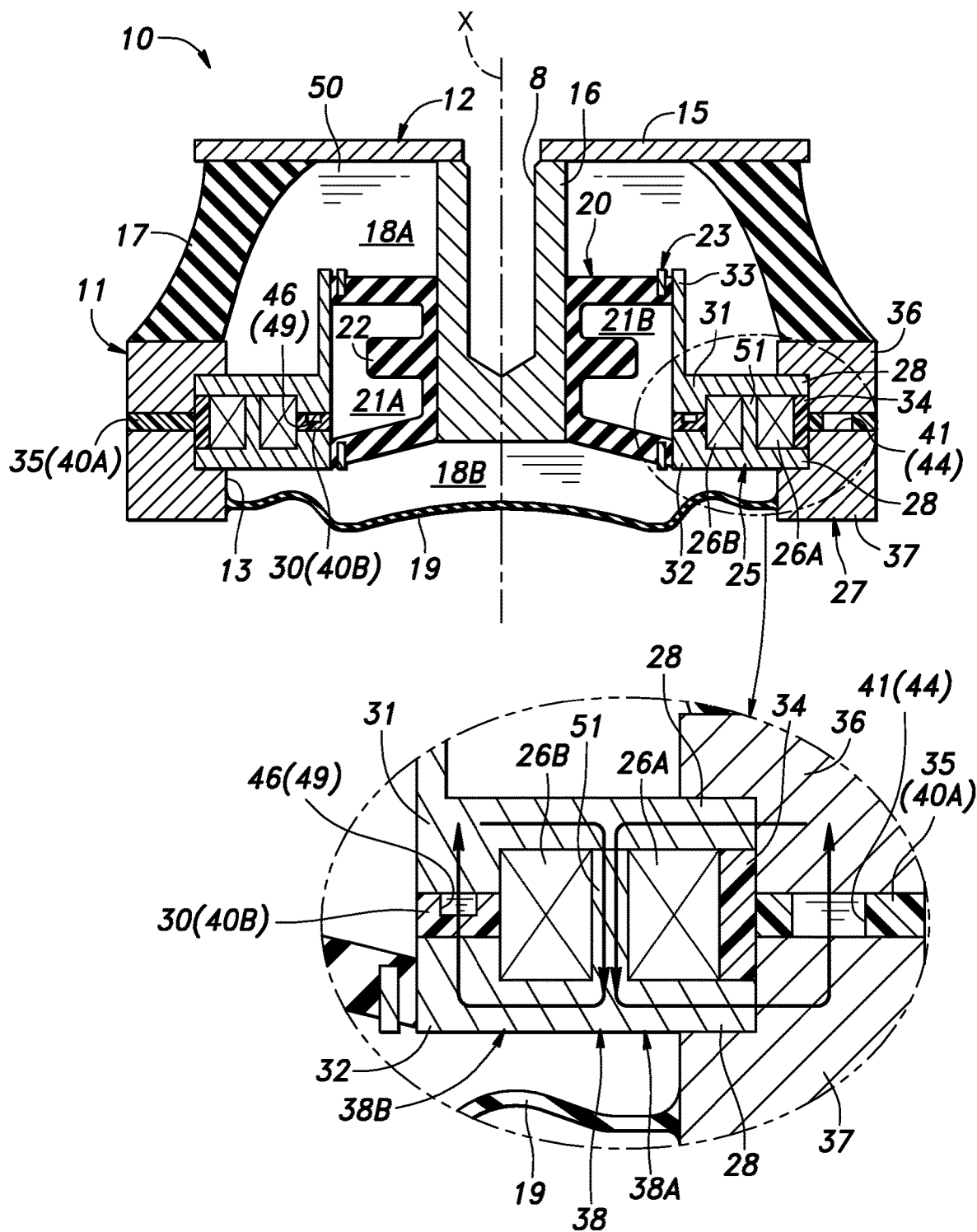
FIG. 11 is a sectional view, in a section corresponding to FIG. 4, of a variable stiffness vibration damping device according to a second embodiment of the present invention.

FIG. 11 is a sectional view, in a section corresponding to FIG. 4, of a vibration damping device 10 according to the present embodiment. As shown in FIG. 11, the first support member 11 includes an annular inner yoke 25 and an annular outer yoke 27. The inner yoke 25 is provided in an inner circumferential portion of the first support member 11. A pair of coils 26 (26A, 26B) are coaxially wound around an outer circumference of the inner yoke 25. The outer yoke 27 is provided in an outer circumferential portion of the first support member 11. The outer yoke 27 is integrated with the inner yoke 25, and surrounds the pair of coils 26 in cooperation with the inner yoke 25. An inner diameter of the first coil 26A located outside is larger than an outer diameter of the second coil 26B located inside.

An annular common yoke 51 formed integrally with the lower inner yoke 32 is located between the first coil 26A and the second coil 26B. The common yoke 51 has a cylindrical shape and extends upward along the axis X from the outer flange portion 28 formed integrally with the lower inner yoke 32. An upper end of the common yoke 51 abuts against a lower face of the outer flange portion 28 formed integrally with the upper inner yoke 31. In other embodiments, the common yoke 51 may be formed integrally with the upper inner yoke 31, or the common yoke 51 may include both a portion integrally formed with the upper inner yoke 31 and another portion integrally formed with the lower inner yoke 32.

As shown in an enlarged view of FIG. 11, by proving the yoke 38 composed of the inner yoke 25 and the outer yoke 27 with the common yoke 51, the yoke 38 forms a first yoke 38A surrounding the first coil 26A and a second yoke 38B surrounding the second coil 26B. The common yoke 51 composes a common portion of the first yoke 38A and the second yoke 38B. The first magnetic gap 40A is formed in the first yoke 38A by the outer passage forming member 35. The second magnetic gap 40B is formed in the second yoke 38B by the inner passage forming member 30.

A voltage is individually applied to each of the first coil 26A and the second coil 26B. Thereby, an electric current is supplied to each of the first coil 26A and the second coil 26B such that magnetic fields in opposite directions are generated around the first coil 26A and the second coil 26B.

When a voltage is applied to the first coil 26A, a magnetic field is generated around the first coil 26A by an electric current flowing therethrough. Thereby, the first yoke 38A that surrounds the first coil 26A forms a magnetic circuit, so that the magnetic field concentrates in the first circumferential passage 41 of the first communication passage 44. By applying the magnetic field to the first circumferential passage 41, viscosity of the magnetic fluid 50 in the first communication passage 44 increases. Accordingly, the resistance applied to the magnetic fluid 50 flowing in the first communication passage 44 increases, so that a damping force against vertical vibrations applied to the vibration damping device 10 increases.

When a voltage is applied to the second coil 26B, a magnetic field is generated around the second coil 26B by the electric current flowing therethrough. Thereby, the second yoke 38B that surrounds the second coil 26B forms a magnetic circuit, so that the magnetic field concentrates in the second circumferential passage 46 of the second communication passage 49. By applying the magnetic field to the second circumferential passage 46, viscosity of the magnetic fluid 50 in the second communication passage 49 increases. Accordingly, the resistance applied to the magnetic fluid 50 flowing in the second communication passage 49 increases, so that a damping force against fore and aft vibrations applied to the vibration damping device 10 increases.

As described above, in the present embodiment, the coil 26 includes: the first coil 26A adjacent to the first circumferential passage 41; and the second coil 26B adjacent to the second circumferential passage 46. Accordingly, it is possible to generate the magnetic field working on the first circumferential passage 41 and to control the damping force against vertical vibrations of the vibration damping device 10 by controlling the voltage applied to the first coil 26A and supplying an electric current thereto. Also, it is possible to generate the magnetic field working on the second circumferential passage 46 and to control the damping force against fore and aft vibrations of the vibration damping device 10 by controlling the voltage applied to the second coil 26B and supplying an electric current thereto. Further, it is possible to individually vary flow resistance of the magnetic fluid 50 in the first circumferential passage 41 and flow resistance of the magnetic fluid 50 in the second circumferential passage 46 by simultaneously supplying the electric currents to the first coil 26A and the second coil 26B. Thereby, it is possible to individually control the damping force against vertical vibrations of the vibration damping device 10 and the damping force against fore and aft vibrations (radial vibrations) of the vibration damping device 10.

Also, the yoke 38 includes: a first yoke 38A configured to form the first magnetic gap 40A and surrounding the first coil 26A; and a second yoke 38B configured to form the second magnetic gap 40B and surrounding the second coil 26B. Accordingly, a magnetic field generated in the first yoke 38A works on the first magnetic gap 40A by supplying an electric current to the first coil 26A, and a magnetic field generated in the second yoke 38B works on the second magnetic gap 40B by supplying an electric current to the second coil 26B. Therefore, it is possible to individually vary flow resistance of the magnetic fluid 50 in the first circumferential passage 41 and flow resistance of the magnetic fluid 50 in the second circumferential passage 46.

Also, the first yoke 38A and the second yoke 38B include the common yoke 51 as a portion common to each other, and the first coil 26A and the second coil 26B generate magnetic fields in directions opposite to each other. Accordingly, a magnetic field generated in the first yoke 38A by supplying an electric current to the first coil 26A and a magnetic field generated in the second yoke 38B by supplying an electric current to the second coil 26B are not weakened due to interference thereof. Also, it is possible to downsize the vibration damping device 10 by providing the first yoke 38A and the second yoke 38B with the portion common to each other.

In other embodiments, in a case where magnetic fields are applied to both the first circumferential passage 41 and the second circumferential passage 46, the first coil 26A and the second coil 26B may generate magnetic fields in the same direction. By generating magnetic fields in the same direction, a magnetic field amplified by both the magnetic field generated by the first coil 26A and the magnetic field generated by the second coil 26B is applied to both the first circumferential passage 41 and the second circumferential passage 46. Accordingly, it is possible to effectively increase resistance applied to the magnetic fluid 50 flowing through the first circumferential passage 41 and the second circumferential passage 46, and thereby to effectively increase a damping force and stiffness of the vibration damping device 10 in both the vertical direction and the fore and aft direction.

Figure 12:
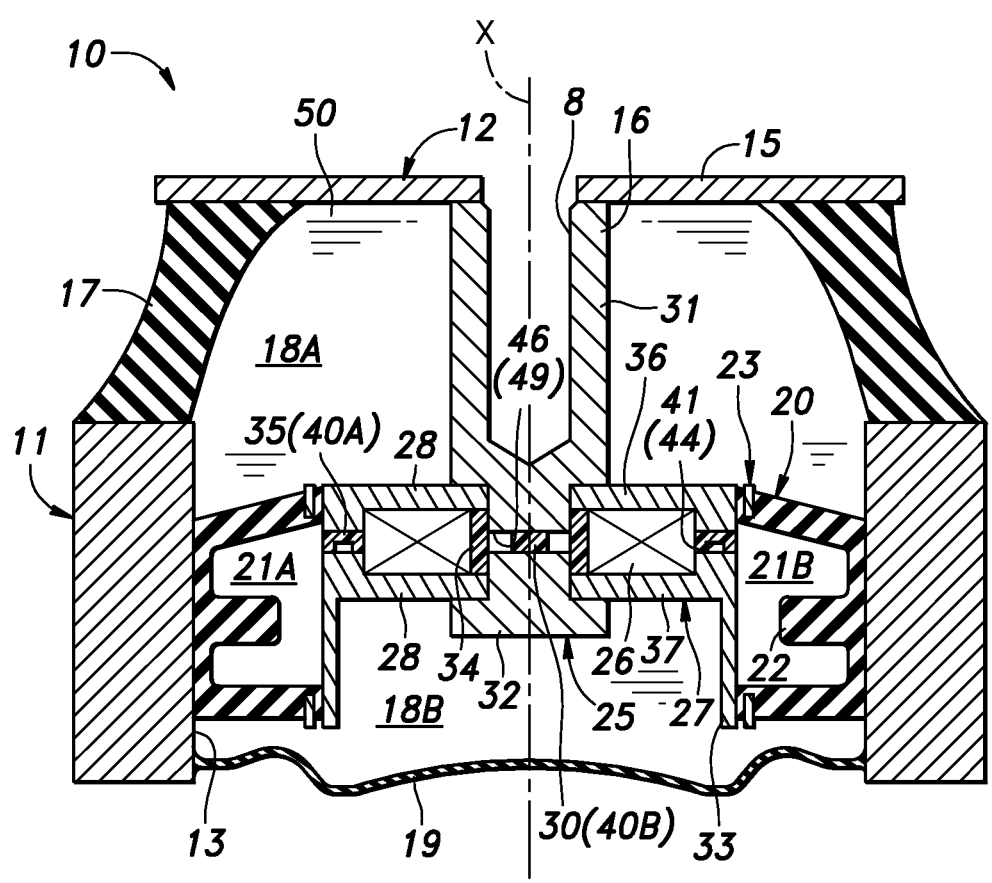
FIG. 12 is a sectional view, in a section corresponding to FIG. 4, of a variable stiffness vibration damping device according to another embodiment of the present invention.

Concrete embodiments of the present invention have been described in the foregoing, but the present invention should not be limited by the foregoing embodiments and various modifications and alterations are possible within the scope of the present invention. For example, in the above embodiments, the entirety of the first support member 11 composes the yoke 38. On the other hand, in other embodiments, the yoke 38 may be provided in any portion of the first support member 11 or the second support member 12. Thus, the first support member 11 or the second support member 12 may include a portion made of a metal having low magnetic permeability. Also, in other embodiments, as shown in FIG. 12, the coil 26, the first communication passage 44 including the first circumferential passage 41, the second communication passage 49 including the second circumferential passage 46, and the like may be provided not in the first support member 11 but in the axial portion 16 of the second support member 12.

Figure 13:
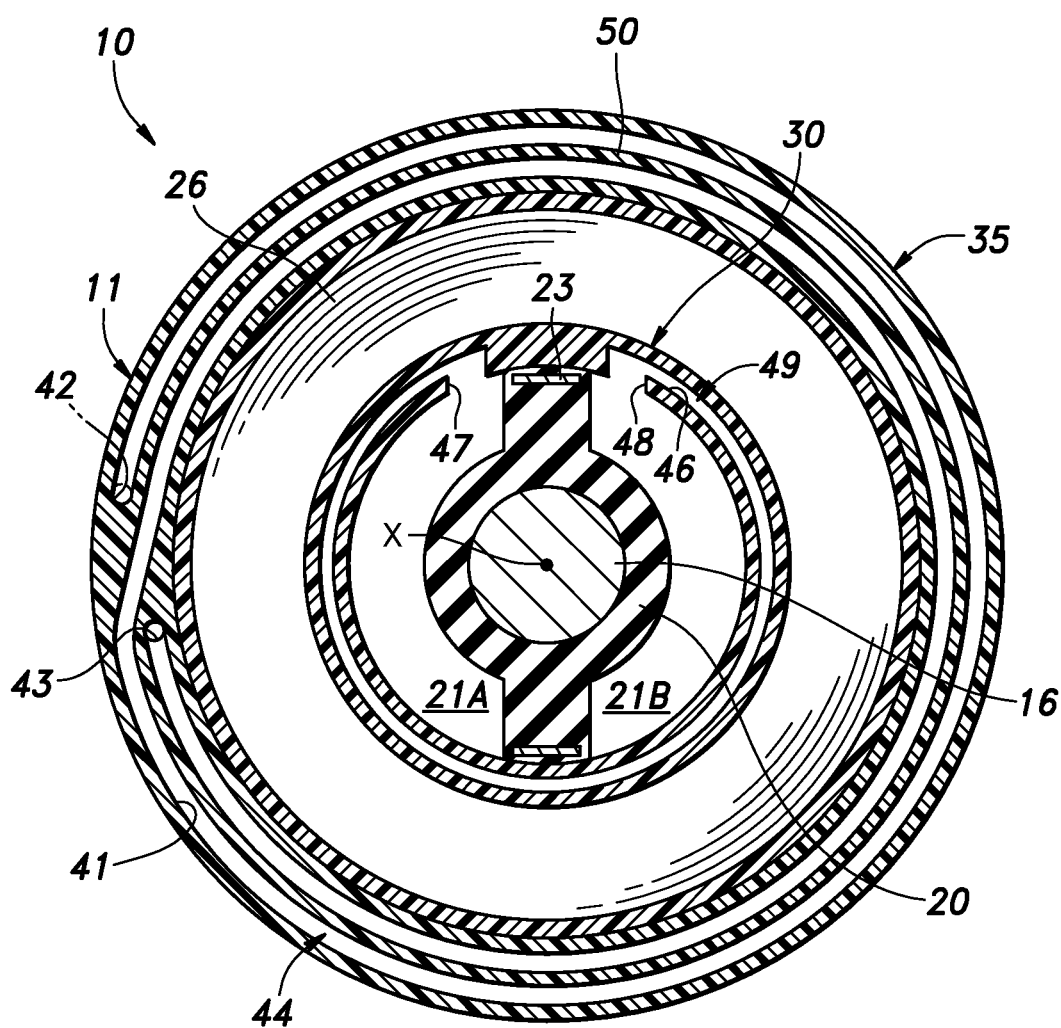
FIG. 13 is a sectional view, in a section corresponding to FIG. 3, of a variable stiffness vibration damping device according to still another embodiment of the present invention.

Also, in the above embodiments, as described with reference to FIG. 3, the first circumferential passage 41 extends in the circumferential direction for an angle smaller than 360°. On the other hand, in other embodiments, as shown in FIG. 13, the first circumferential passage 41 may extend in the circumferential direction for an angle equal to or larger than 360°. In such a case, at least a part in the circumferential direction of the first circumferential passage 41 may have a multiplex configuration in which one portion formed inside in the radial direction and another portion formed outside in the radial direction overlap with each other in the circumferential direction. Accordingly, the first communication port 42 that communicates with an outer end in the radial direction of the first circumferential passage 41 is formed in the upper outer yoke 36 not by a groove shown in FIG. 6 but by a through hole. By forming the first circumferential passage 41 that extends for an angle equal to or larger than 360° and has a multiplex configuration, it is possible to increase a changing amount of a damping force against vertical vibrations of the vibration damping device 10.

Further, in the above embodiments, the vibration damping devices 10 are used as the engine mounts in an engine support portion of the automobile 1, i.e. a vibration generating portion of the automobile 1. On the other hand, in other embodiments, the vibration damping device 10 can be applied to various portions that generate vibrations, for example, a motor support portion of the automobile 1, a suspension of the automobile 1, or a vibration generating portion of the device other than the automobile 1. In addition, a specific configuration, an arrangement, quantity, an angle, and the like of each member and each portion thereof shown in the above embodiments can be changed as appropriate within the scope of the present invention. Further, not all of the structural elements shown in the above embodiments are necessarily indispensable and they may be selectively adopted as appropriate. Also, the structures of the above embodiments may be combined as appropriate.

The invention claimed is:

1. A variable stiffness vibration damping device, comprising:
    an annular first support member defining an inner hole therein;
    a second support member including a support portion separated from the first support member with respect to an axial direction;
    an annular main elastic member connecting the first support member and the support portion of the second support member;
    a diaphragm closing the inner hole of the first support member such that a liquid chamber is defined between the main elastic member and the diaphragm;
    a partition elastic member partitioning the liquid chamber into a first liquid chamber on a side of the main elastic member and a second liquid chamber on a side of the diaphragm;
    a first communication passage provided in one of the first support member and the second support member such that the first liquid chamber and the second liquid chamber communicate with each other via the first communication passage, the first communication passage including a first circumferential passage extending in a circumferential direction;
    at least one coil wound coaxially with and provided in the one of the first support member and the second support member;
    a yoke included in the one of the first support member and the second support member and configured to form a first magnetic gap overlapping at least partially with the first circumferential passage; and
    a magnetic fluid filling the first liquid chamber, the second liquid chamber, and the first communication passage,
    wherein the second support member further includes an axial portion protruding from the support portion toward the first support member and received by the inner hole of the first support member,
    the partition elastic member has an annular shape around the axial portion to connect an inner circumferential portion of the first support member and an outer circumferential portion of the axial portion,
    the partition elastic member is provided with at least one pair of third liquid chambers opposed to each other in a radial direction with the axial portion therebetween and partitioned with each other in the circumferential direction,
    a second communication passage is provided in the one of the first support member and the second support member such that the at least one pair of third liquid chambers communicate with each other via the second communication passage, and the second communication passage includes a second circumferential passage extending in the circumferential direction,
    the yoke is configured to form a second magnetic gap overlapping at least partially with the second circumferential passage, and
    the first circumferential passage is located on an outer circumferential side of the at least one coil, and the second circumferential passage is located on an inner circumferential side of the at least one coil.

2. The variable stiffness vibration damping device according to claim 1, wherein the at least one coil includes:
    a first coil adjacent to the first circumferential passage; and
    a second coil adjacent to the second circumferential passage.

3. The variable stiffness vibration damping device according to claim 2, wherein the yoke includes:
    a first yoke configured to form the first magnetic gap and surrounding the first coil; and
    a second yoke configured to form the second magnetic gap and surrounding the second coil.

4. The variable stiffness vibration damping device according to claim 3, wherein the first yoke and the second yoke include a portion common to each other, and
    the first coil and the second coil are configured to generate magnetic fields in directions opposite to each other.

5. The variable stiffness vibration damping device according to claim 1, wherein the partition elastic member is located at least partially in the inner hole of the first support member and extends in a direction substantially orthogonal to the axial direction.

6. A variable stiffness vibration damping device, comprising:
    an annular first support member defining an inner hole therein;
    a second support member including a support portion separated from the first support member with respect to an axial direction;

an annular main elastic member connecting the first support member and the support portion of the second support member;

a diaphragm closing the inner hole of the first support member such that a liquid chamber is defined between the main elastic member and the diaphragm;

a partition elastic member partitioning the liquid chamber into a first liquid chamber on a side of the main elastic member and a second liquid chamber on a side of the diaphragm;

a first communication passage provided in one of the first support member and the second support member such that the first liquid chamber and the second liquid chamber communicate with each other via the first communication passage, the first communication passage including a first circumferential passage extending in a circumferential direction;

at least one coil wound coaxially with and provided in the one of the first support member and the second support member;

a yoke included in the one of the first support member and the second support member and configured to form a first magnetic gap overlapping at least partially with the first circumferential passage; and a magnetic fluid filling the first liquid chamber, the second liquid chamber, and the first communication passage, wherein the yoke includes:

a passage forming member forming the first circumferential passage; and a pair of stacked members stacked in the axial direction with the passage forming member therebetween, and magnetic permeability of the passage forming member is lower than that of the pair of stacked members.

* * * * *